United States Patent
De Kruijf et al.

(10) Patent No.: US 10,065,724 B2
(45) Date of Patent: Sep. 4, 2018

(54) ARRANGEMENT FOR SEALING A PROPELLER SHAFT OF A MARINE VESSEL AND A METHOD OF CONTROLLING THE OPERATION THEREOF

(75) Inventors: Arnoud De Kruijf, Haaren (NL); Rik Roemen, Oisterwijk (NL); Minoru Takayasu, Toyama (JP); Bart Van Der Ven, Waspik (NL); Joost Van Eijnatten, 's-Hertogenbosch (NL); Masahiko Yotsuyanagi, Toyama (JP)

(73) Assignee: WARTSILA FINLAND OY, Vaasa (FI)

( * ) Notice: Subject to any disclaimer, the term of this patent is extended or adjusted under 35 U.S.C. 154(b) by 417 days.

(21) Appl. No.: 14/395,209

(22) PCT Filed: Apr. 17, 2012

(86) PCT No.: PCT/FI2012/050375
§ 371 (c)(1),
(2), (4) Date: Nov. 17, 2014

(87) PCT Pub. No.: WO2013/156662
PCT Pub. Date: Oct. 24, 2013

(65) Prior Publication Data
US 2015/0076768 A1    Mar. 19, 2015

(51) Int. Cl.
*F16J 15/3296*   (2016.01)
*B63H 23/32*    (2006.01)

(52) U.S. Cl.
CPC ........ *B63H 23/321* (2013.01); *F16J 15/3296* (2013.01); *B63H 2023/327* (2013.01)

(58) Field of Classification Search
CPC ...... F16J 15/3256; F16J 15/324; F16J 15/168; F16J 15/3296
See application file for complete search history.

(56) References Cited

U.S. PATENT DOCUMENTS

| | | | | |
|---|---|---|---|---|
| 3,071,384 | A | * | 1/1963 | Friberg ................... F01D 11/04 277/430 |
| 3,414,274 | A | * | 12/1968 | Aronson ................. F01D 11/04 277/432 |
| 3,533,635 | A | * | 10/1970 | Morrissy .................. F16J 15/40 277/318 |
| 4,193,603 | A | * | 3/1980 | Sood ....................... F01D 11/06 277/303 |

(Continued)

FOREIGN PATENT DOCUMENTS

| | | |
|---|---|---|
| DE | 3718411 A1 | 12/1988 |
| DE | 3742079 A1 | 6/1989 |

(Continued)

OTHER PUBLICATIONS

International Search Report for PCT/FI2012/050375 dated Mar. 4, 2013.

*Primary Examiner* — Kristina R Fulton
*Assistant Examiner* — L. Susmitha Koneru
(74) *Attorney, Agent, or Firm* — Heslin Rothenberg Farley & Mesiti P.C.; Victor A. Cardona, Esq.

(57) ABSTRACT

An arrangement for sealing a propeller shaft of a marine vessel are specifically applicable in preventing oil leakage via propeller shaft sealing in cases where the draught of a marine vessel is, for some reason, reduced beyond its ordinary value.

19 Claims, 2 Drawing Sheets

(56) References Cited

U.S. PATENT DOCUMENTS

| | | | | |
|---|---|---|---|---|
| 4,469,335 A * | 9/1984 | Moore | A61L 2/26 | |
| | | | 277/648 | |
| 5,643,026 A * | 7/1997 | Pietsch | B63H 23/321 | |
| | | | 277/320 | |
| 5,683,278 A * | 11/1997 | Pietsch | B63H 23/321 | |
| | | | 277/563 | |
| 5,906,374 A * | 5/1999 | Arbuckle | F16K 37/0091 | |
| | | | 277/304 | |
| 6,296,255 B1 * | 10/2001 | Hashimoto | F16J 15/006 | |
| | | | 277/558 | |
| 6,689,221 B2 * | 2/2004 | Ryding | C23C 14/505 | |
| | | | 118/724 | |
| 6,708,981 B2 * | 3/2004 | Hall | F01D 11/06 | |
| | | | 277/431 | |
| 8,082,939 B2 * | 12/2011 | Sears | F04D 29/124 | |
| | | | 137/1 | |
| 2004/0245728 A1 * | 12/2004 | Armour | F16J 15/324 | |
| | | | 277/549 | |

FOREIGN PATENT DOCUMENTS

| | | | |
|---|---|---|---|
| DE | 4434261 A1 | 3/1996 | |
| EP | 1182133 A1 | 2/2002 | |
| JP | 7017488 A | 1/1995 | |
| JP | 7113470 A | 5/1995 | |

\* cited by examiner

ARRANGEMENT FOR SEALING A PROPELLER SHAFT OF A MARINE VESSEL AND A METHOD OF CONTROLLING THE OPERATION THEREOF

CROSS-REFERENCE TO RELATED APPLICATIONS

This application is a 371 National Phase of PCT International Application No. PCT/FI2012/050375 filed on Apr. 17, 2012, and published in English as WO 2013/156662 A1 on Oct. 24, 2013, the entire disclosure of which is incorporated herein by reference.

TECHNICAL FIELD

The present invention relates to a novel arrangement for sealing a propeller shaft of a marine vessel and a method of controlling the operation thereof. The method and the arrangement of the present invention are specifically applicable in low draught applications where the propeller shaft is for some reason close to the waterline.

BACKGROUND ART

The propeller shafts of marine vessels require always a sealing arrangement for preventing the sea or fresh water from entering into the interior of the stern tube or thruster where at least the bearings of the shaft and often also some kind of a gear are located. Very often the bearings of the propeller shaft are arranged in a closed cavity, which is at least partially filled with oil, whereby the seals are also needed for preventing the lubrication oil from leaking to the sea or lake. Thus the minimum requirement is that there is one seal facing outward and one seal facing inward, However, very often there are, for safety reasons, more than one seal, on the one hand, for preventing the entrance of the sea or fresh water, and on the other hand, for preventing the escape of lubrication oil.

FIG. 1 illustrates a state-of-the-art propeller shaft seal based on lip type sealing rings. The Figure shows that several sealing rings are applied for the sealing, i.e. there are two left hand side rings for preventing the entrance of seawater inside the thruster and two right hand side rings for preventing the lubrication oil from leaking to the sea. A problem with this type of sealing is the water pressure acting on the outermost sealing ring. The pressure is, naturally, the higher; the deeper is the propeller shaft. Therefore it is common practice to apply pressure between each set of lip type seals. By means of the pressure inside the seal between the sealing rings the force by which the seal lip is pressed against the shaft or shaft sleeve is regulated in view of sealing, wear and energy consumption. The correct pressure is normally assured by means of placing a header or monitoring tank, which contains oil, at an appropriate height above the seal. In other words, it is the hydrostatic oil pressure that forms the desired counter pressure.

However, in cases when the draught of the vessel is reduced or has to be reduced, for some reason, the propeller shaft is raised closer to the waterline. This results in the reduction of the water pressure against the seal, whereby the constant oil pressure on the opposite side of the sealing ring easily exceeds the water pressure. An almost unavoidable consequence is an oil leakage to the sea or lake. Situations where such an oil leakage may take place relate, at least, to cases when a marine vessel is brought to a dry dock for inspection, maintenance and/or repair. Also, the type and/or the construction of the vessel may be such that the draught of the vessel is relatively low, and may also vary depending on the operating conditions. In other words, sometimes the construction of the vessel and its propulsion arrangement may be such that the header or monitoring tank has to be positioned at a height above the waterline, whereby the hydrostatic oil pressure is relatively high.

If the seal in question is applied in a thruster the problem is even more serious. The placement of the header or monitoring tank down within the thruster is not an option since the tank would no longer be accessible for filling or monitoring. The monitoring tank is therefore placed up within the vessel frame. As a result the header or seal monitoring tank is placed at a distance above the propeller shaft the distance corresponding at least to the height of the thruster. When using such thrusters in vessels with a low draught there occurs in succession such situations that the assurance of the correct pressure within the seal is impossible.

A thruster as here understood is such a propulsion device of a marine vessel that is formed of at least a propeller unit situated, at least in its operating position, beneath the hull of the marine vessel. The thruster may be a steerable one, a retractable one or a stationary one. The drive of the propeller may be arranged mechanically, hydraulically or electrically.

BRIEF SUMMARY OF THE INVENTION

A first object of the present invention is to offer a solution to the above discussed problem, in the least.

A second object of the present invention is to ensure a reliable and safe sealing of the propeller shaft of a marine vessel irrespective of the type of propulsion.

A third object of the present invention is to suggest such a sealing of the propeller shaft of a marine vessel that works in a reliable and safe manner irrespective of the draught of the marine vessel.

At least one of the above and other objects of the invention are met by an arrangement for sealing a propeller shaft of a marine vessel, the sealing arrangement comprising a sealing housing with an outward set of sealings and an inward set of sealings, the sealing housing adapted to be installed in connection with the propeller shaft or a shaft sleeve arranged on the propeller shaft, the housing having a chamber II between the inward and outward sets of the sealings, the chamber II being connected by means of a connection line to a header tank containing oil, the arrangement further comprising means for providing the header tank with a sub-atmospheric pressure.

At least one of the above and other objects of the invention are met by a method of controlling the operation of a sealing arrangement of a propeller shaft of a marine vessel, the sealing arrangement comprising a sealing housing with an outward set of sealings and an inward set of sealings, the sealing housing adapted to be installed in connection with the propeller shaft or a shaft sleeve arranged on the propeller shaft, the housing having a chamber II between the inward and outward sets of the sealings, the chamber II having a pressure $p_{II}$ and being connected by means of a connection line to a header tank containing oil, the method comprising the step of providing the header tank with a sub-atmospheric pressure.

Other characteristic features of the present arrangement for sealing a propeller shaft of a marine vessel and a method of controlling the operation thereof will become apparent from the appended dependent claims.

The present invention, when solving at least the above-mentioned problem,

Prevents oil leakage via the propeller shaft sealing,

Reduces drastically the risk of bearing, gear and other failures in the area of the propeller shaft of a marine vessel, Allows free positioning of the seal monitoring tanks, as the height of the tank does not dictate the positioning of the tank, and Increases seal life and reduces the need for maintenance.

BRIEF DESCRIPTION OF DRAWING

In the following, the novel arrangement for sealing a propeller shaft of a marine vessel and a method of controlling the operation thereof is explained in more detail with reference to the accompanying Figures, of which

DETAILED DESCRIPTION OF DRAWINGS

Figure 1:
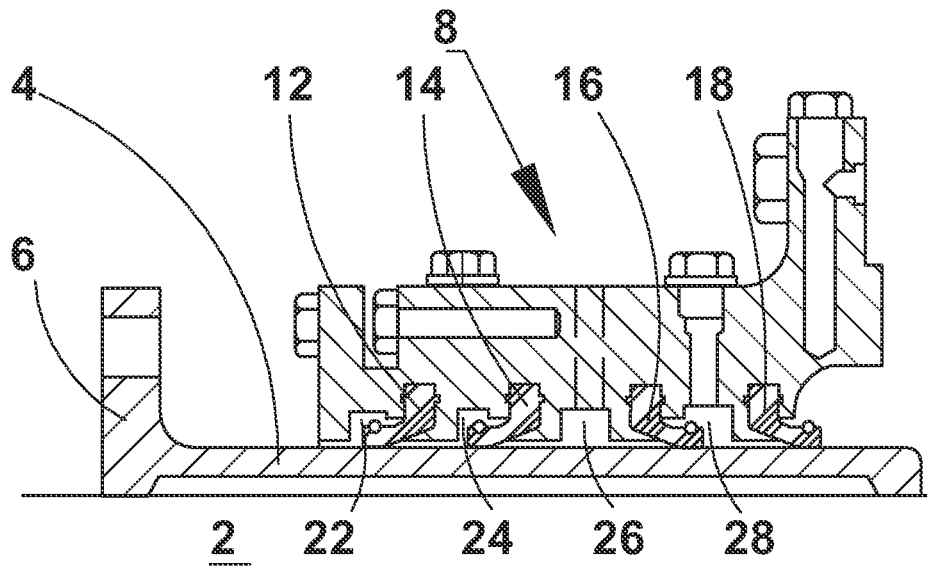
FIG. 1 illustrates an exemplary prior art sealing arrangement of a propeller shaft of a marine vessel.

FIG. 1 illustrates a standard propeller shaft seal based on lip type sealing rings. The propeller shaft is shown by reference numeral 2, and the shaft sleeve arranged on the shaft 2 by reference numeral 4. The shaft sleeve 4 is provided at the left with a flange 6 for attaching the shaft sleeve to a propeller or to another flange arranged to the end of the propeller shaft 2. The purpose of the shaft sleeve 4 is to protect the shaft 2 from unavoidable wear that occurs during the rotation of the shaft 2 due to friction between the sealing rings 12, 14, 16 and 18 and the rotary member. Sometimes the shaft sleeve 4 has been left out so that the sealing rings 12, 14, 16 and 18 cooperate with the surface of the shaft 2. The stationary part of the sealing is formed of a seal housing 8, which includes a number of components such that grooves into which the foot parts of the sealing rings 12, 14, 16 and 18 fit have been arranged in connection with the components. More exact discussion of the design of the seal housing 8 is not needed here. In addition to the grooves, the inner surface of the seal housing 8 facing the shaft 2 or shaft sleeve 4 is provided with cavities 22, 24, 26 and 28. Cavities 22, 24 and 28 are arranged for the lip parts of the sealing rings 12, 14 and 16, whereas the cavity 26 is left between the two sets of sealing rings 12, 14 and 16, 18. The lips of the sealing rings 12 and 14 situated in cavities 22 and 24 are directed towards the sea or fresh water, and prevent such from entering, for instance, the bearings of the propeller shaft 2. The leftmost cavity 22 is in direct communication with the sea or lake via a narrow clearance between the seal housing 8 and the shaft 2 or shaft sleeve 4. Thus it is the sealing ring 12 that, for the most part, performs the required sealing, whereby the main task of the next or second sealing ring 14 is to act as a safety sealing ring which takes over the sealing task if the first sealing ring 12 fails, i.e. starts leaking. The lips of sealing rings 16 and 18 are directed in an opposite direction, i.e. for instance towards the inside of the thruster in order to prevent the lubrication oil from leaking towards the sea or lake. Between each set of lip type seals a pressure is applied. The correct pressure is normally assured through the placement of a header or monitoring tank at a prescribed height above the seal.

Figure 2:
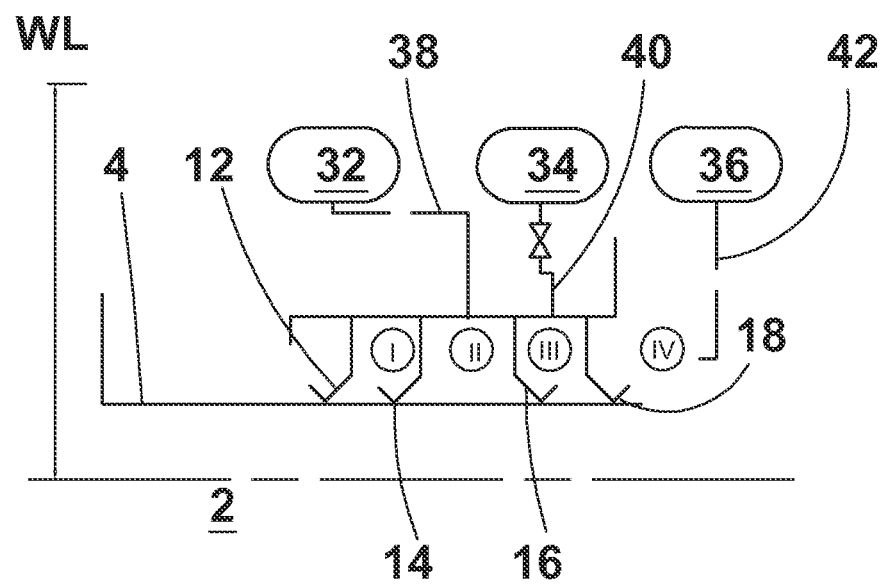
FIG. 2 illustrates schematically the operation of a prior art sealing arrangement of FIG. 1.

FIG. 2 presents a schematic overview of the propeller shaft sealing arrangement with its monitor (or header) tanks 32, 34 and 36. The chambers or cavities between the seals are indicated by roman numerals I, II and III such that chamber I corresponds to cavity 24 of FIG. 1, chamber II to cavity 26 of FIG. 1 and chamber III to cavity 28 of FIG. 1. Furthermore roman numeral IV corresponds to chamber IV i.e. the interior of the thruster. The seals perform their sealing function optimally, if appropriate pressure is present at the correct side of the seal. For minimizing the friction and thus the wearing of the seal and its counter surface a minimum applicable pressure is required. The seal has, however, to be pressed against the shaft with sufficient force. This means for the leftmost seal 12 that the pressure of the water, acting on the left hand side surface of the seal 12 has to be high enough for ensuring the required pressure between the seal lip and its counter surface. In practice this means that the pressure at the other (right hand) side of the sealing ring may not be too high so that it could push the seal lip out of contact from its counter surface. The same is true for the sealing ring 14. Both outward facing sealing rings 12 and 14 are intended to keep the water out. The correct pressure on the inside (right hand side) of the seals 12 and 14 is arranged through a connection line 38 from the header tank 32 to chamber II. The inward facing sealing rings 16 and 18 are intended to keep the oil within the thruster. The sealing ring 16 is a spare for the sealing ring 18. The chamber indicated with III in FIG. 2, has a pressure similar to the pressure within the thruster, or more generally within the interior of the space IV housing the propeller shaft 2. By closing the connection 40 between the monitoring tank 34 and the chamber III sealing ring 18 is used instead of ring 16.

For a conventional marine vessel the propeller shaft 2 enters the vessel through a stern tube or a similar construction. The application of the correct, low enough, pressure within the cavity 26 (FIG. 1) or chamber II between seal 14 and 16 (FIG. 2) may be arranged by placing the seal monitoring tank 32 low enough with respect to the water level WL (here somewhat below the water level) and the propeller shaft 4. If such a vessel is moved to operate in such an environment that low draught is required, the placement of the seal monitoring tank 32 provides too high a pressure in chamber II. Thus, it is clear that, if the draught of the vessel is lower than the draught ensuring the required minimum water pressure on the seals 12 and 14, the seal rings 12 and 14 will start leaking. In practice, the seal monitoring tank 32 may be, and in case of a low draught vessel often is positioned somewhat above the propeller shaft as shown in FIG. 2. Since the lips of the sealing rings are normally provided with a ring-shaped springs pressing the seal lips against the shaft or shaft sleeve surface or the lips may be provided with certain stiffness or pre-tension giving the initial pressure against the shaft or shaft sleeve, such lips of the sealing ring allow some fluctuation in the pressure in chamber II.

Figure 3:
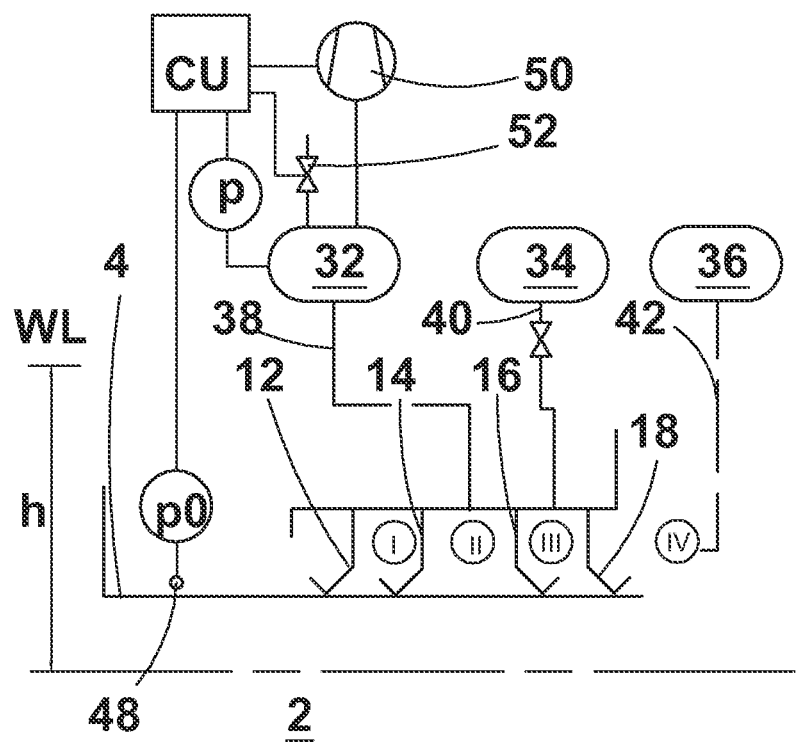
FIG. 3 illustrates schematically the construction and operation of a sealing arrangement in accordance with a first preferred embodiment of the present invention and FIG. 4 illustrates schematically the construction and operation of a sealing arrangement in accordance with a second preferred embodiment of the present invention.

FIG. 3 illustrates a propeller shaft sealing arrangement in accordance with a preferred embodiment of the present invention the sealing arrangement being capable of presenting a solution to the above discussed problem. In the preferred embodiment of FIG. 3 the propeller shaft sealing arrangement is provided with a control circuit for regulating the pressure in the header tank 32. The control circuit comprises a control unit CU that collects information at least as follows: pressure information p from the seal monitoring tank or header tank 32, and information on the water pressure $p_O$ in front of the sealing ring. The pressure p0 may be determined by a pressure sensor 48 arranged in front of the sealing or by a sensor following the changes in the waterline WL of the vessel provided that the vertical position of the propeller shaft in relation to the vessel frame is constant. The control unit CU is further connected to a vacuum pump 50 or another means by means of which the pressure within the seal monitoring tank 32 may be decreased, and to an air valve 52 by means of which ambient air may be allowed to flow in the header tank 32 if the pressure in the tank needs to be raised closer to atmospheric pressure. Thus by means of the gathered information the control unit CU operates the vacuum pump 50 or the air valve 52 such that the pressure within the header tank 32, and as a result, the pressure in chamber II is at an appropriate level for preventing the risk of oil leakage.

The arrangement discussed above is based on controlling the pressures between various sealing rings 12-18. The various pressures affecting the sealing function are presented in the following. $p_O$=water pressure at the outside (to the left) of the sealing ring 12. The water pressure $p_O$ is dependent on the draught of the vessel and the height and construction of the propulsion arrangement, for instance those of a thruster. $p_I$=oil pressure between the sealing rings 12 and 14. The pressure is not controlled or monitored. $p_{II}$=oil pressure between the sealing rings 14 and 16. The pressure is regulated by the header or monitoring tank 32 connected to chamber II. $p_{III}$=oil pressure in chamber III. The pressure $p_{III}$ is identical to the oil pressure within the thruster. $p_{IV}$=oil pressure within the thruster in chamber IV. The pressure $p_{IV}$ is slightly higher than the pressure of the surrounding water. $p_h$=hydrostatic pressure in chamber II, resulting from the height difference between the oil in the tank 32 and the chamber II.

The arrangement of the present invention illustrated in FIG. 3 functions such that the control unit CU monitors both the air pressure p in the header or monitoring tank 32 and the water pressure $p_O$ in front of the seal 12. The latter is done either directly or indirectly by following the changes in the waterline WL in relation to the depth h of the propeller shaft 2. On the one hand, the pressure $p_{II}$ in chamber II is the sum of pressure p in the header tank 32 and the hydrostatic pressure $p_h$, i.e. $p_{II}=p+p_h$. On the other hand, the pressure $p_{II}$ in chamber II should be lower than the water pressure $p_O$, i.e. $p_{II}<p_O$. In fact, $p_O-p_{II}$ has an optimal value or at least an optimal range, for the sealing ring 12 and/or 14 to work properly and reliably. However, since $p_O$ is changing as a function of draught the difference $p_O-p_{II}$ changes with the draught, too. In practice, when the draught is reduced to a certain level the difference $p_O-p_{II}$ moves out of the optimal range, and the seal/s 12 and/or 14 are in the risk of leaking. Since the only factor that may be practically adjusted, is the pressure p in the header tank, the arrangement is provided with means for regulating the pressure p in the header tank 32. Thus the control unit compares $p_O$ with p, as $p_h$ has a constant value, and controls the operation of the vacuum pump 50 and/or the air valve 52 such that the value of p is such that the pressure difference $p_O-p_{II}$ over the sealing ring 12 is maintained within the above discussed optimal range. Naturally, the pressure p is lower than the atmospheric pressure, as the draught is either low by nature or reduced from its normal value based on which the height of the monitoring tank is originally determined. As a consequence the required pressure within the chamber II between the outward (towards the water) and inward (towards the bearings, for instance) facing seals can be adjusted to the correct value or range. The applied pressure is then independent of the placement of the header tank.

Figure 4:
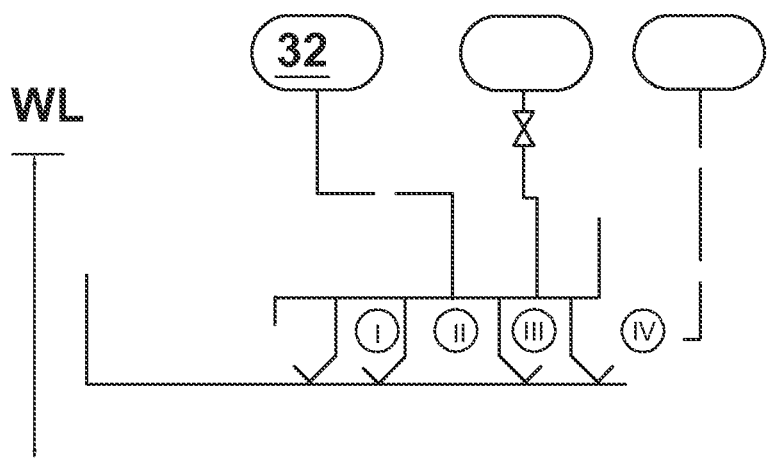

The above discussed basic principle, i.e. applying a non-atmospheric pressure in the monitoring or header tank 32, may be utilized in a number of ways. Firstly, as shown as a second preferred embodiment of the present invention in FIG. 4, it is possible to arrange a constant sub atmospheric pressure in the header tank 32, whereby the header tank may be positioned somewhat higher in the vessel frame than in prior art constructions, i.e. above the water level WL. This arrangement does not necessarily need constant control of the pressure, but just monitoring of the pressure (or oil level) in the header tank 32 is sufficient. Naturally, if the pressure (or oil level) starts changing it is a clear symptom of a leakage in the system. A still more simplified solution to the prior art problem of having the monitoring tank too high in the vessel structures is to arrange a fixed sub-atmospheric pressure in the header or monitoring tank such that the oil pressure in chamber II is acceptable for all normal operating conditions. Any leakage of oil towards the sea or lake will result in oil loss from the tank (lowering the oil level). Or, in an opposite case, when the sea- or fresh water is leaking into the tank, the liquid level in the tank is raised. In other words, both leakage types will result in a deviation of the oil level.

Secondly, it is possible to control the pressure in the header tank without the control unit, by just providing the operator of the system with some kind of a pressure gauge indicating the pressure p in the header tank 32 and means for operating the vacuum pump 50 and the air valve 52. Thus each time the draught of the marine vessel changes significantly, the operator is able to manually run either the vacuum pump 50 for decreasing the pressure p in the header tank 32 or the air valve 52 for increasing the pressure p in the header tank 32. Naturally, this kind of pressure providing means, i.e. at least a vacuum pump and a pressure gauge, possibly also an air valve, are needed also in the above discussed first option, when taking the arrangement in use.

Thirdly, it is possible to input, for instance, three different target pressure values for the pressure p in the memory of the control unit CU. The target pressure values could be: one for a fully loaded marine vessel, one for an empty marine vessel, and one for a marine vessel about to be dry-docked. Such a control unit CU may be operated without any information on the water pressure in front of the sealing. The operator of the marine vessel merely needs to inform the control unit the status change of the vessel, whereafter the control unit operates automatically the vacuum pump or the air valve to provide the header tank with the desired pressure. In other words, when the marine vessel is about to be dry-docked, the operator informs the control unit accordingly, and the control unit starts running the vacuum pump and keeps it running as long as the preprogrammed target pressure in the header tank is reached. In a corresponding manner when the marine vessel is taken back to use from the dry dock the operator informs the control unit accordingly, and the control unit opens the air valve in communication with the header tank and allows air to enter into the header tank as long as the target pressure is reached.

Fourthly, the application of a control unit gives a possibility to regulate the pressure in chamber II continuously, i.e. for instance when the draught of the vessel changes due to changes in the weight of the cargo. Thereby the seal lips may be arranged to operate always with the lowest possible, but still safe, pressure and friction conditions.

As to the basic structure of the sealing arrangement it has to be understood that the present invention may be applied in connection with all such seal types that require and need both the water pressure and the counter acting pressure on the opposite side of the seal. Also it should be understood that the sealing arrangement in connection with which the present invention may be applied may comprise one or more outward facing seals and one or more inward facing seals. Thus, the present invention relates to the regulating the pressure between the inward set and outward set of seals, the set including one or more seals.

It should be understood that the above is only an exemplary description of a novel method of and an arrangement for sealing a propeller shaft of a marine vessel. It should be understood that the above description discusses only a few preferred embodiments of the present invention without any purpose to limit the invention to the discussed embodiments and their details only. Thus the above specification should not be understood as limiting the invention by any means but the entire scope of the invention is defined by the appended claims only. From the above description it should be understood that separate features of the invention may be used in connection with other separate features even if such a combination has not been specifically discussed in the description or shown in the drawings.

The invention claimed is:

1. An arrangement for sealing a propeller shaft of a marine vessel, the sealing arrangement comprising:
   a sealing housing with an outward set of sealing rings having lips directed towards the sea or fresh water and an inward set of sealing rings having lips directed towards the inside of the thruster, the inward set of sealing rings being located in the sealing housing between the outward set of sealing rings and the inside of the thruster, the sealing housing adapted to be installed in connection with the propeller shaft or a shaft sleeve arranged on the propeller shaft,
   the housing having a chamber between the inward and outward sets of sealing rings,
   the chamber being connected by means of a connection line to a header tank containing oil, and
   means for providing both the header tank and the chamber between the inward and outward sets of sealing rings with a sub-atmospheric pressure.

2. The arrangement as recited in claim 1, wherein the pressure providing means comprises a vacuum pump.

3. The arrangement as recited in claim 1, wherein the pressure providing means further comprises means for allowing ambient air to enter the header tank.

4. The arrangement as recited in claim 1, wherein said pressure providing means further comprises means for monitoring the pressure p in the header tank.

5. The arrangement as recited in claim 1, wherein said pressure providing means further comprises a control unit.

6. The arrangement as recited in claim 4, wherein the control unit is connected to the means for monitoring the pressure p in the header tank.

7. The arrangement as recited in claim 5, further comprising in communication with the control unit for monitoring water pressure p0 in front of the sealing, means for monitoring the pressure p in the header tank.

8. The arrangement as recited in claim 7, wherein the water pressure p0 monitoring means is a pressure sensor in front of the sealing.

9. The arrangement as recited in claim 7, wherein the water pressure monitoring means is a sensor measuring the height of the waterline WL.

10. A method of controlling the operation of a sealing arrangement of a propeller shaft of a marine vessel, the sealing arrangement comprising a sealing housing with an outward set of sealings and an inward set of sealings, the sealing housing adapted to be installed in connection with the propeller shaft or a shaft sleeve arranged on the propeller shaft, the housing having a chamber II between the inward and outward sets of sealings, the chamber II having a pressure pII and being connected by means of a connection line to a header tank containing oil, and the method comprising:
   providing the header tank with a sub atmospheric pressure.

11. The method as recited in claim 10, wherein the providing the header tank comprising providing the header tank with a constant sub atmospheric pressure.

12. The method as recited in claim 10, further comprising regulating the pressure in the header tank.

13. The method as recited in claim 10, further comprising providing the sealing arrangement with means for regulating the pressure p in the header tank.

14. The method as recited in claim 10, further comprising providing the sealing arrangement with a control unit for regulating the pressure p in the header tank.

15. The method as recited in claim 14, further comprising monitoring water pressure p0 in front of the sealing arrangement by means of the control unit, and regulating the pressure p in the header tank as a function of the water pressure p0.

16. The method as recited in claim 15, further comprising monitoring the water pressure either directly by means of a pressure sensor arranged in front of the sealing or indirectly by following the changes in the waterline WL in relation to the depth h of the propeller shaft.

17. The method as recited in claim 14, further comprising controlling the operation of the pressure regulating means by the control unit.

18. The method as recited in claim 13, further comprising manually operating the pressure regulating means.

19. The method as recited in claim 14, further comprising giving manual instructions to the control unit CU to operate the pressure regulating means.

* * * * *